United States Patent
Gustafsson et al.

(10) Patent No.: US 10,632,978 B2
(45) Date of Patent: Apr. 28, 2020

(54) METHOD AND SYSTEM FOR DETERMINING FRICTION BETWEEN THE GROUND AND A TIRE OF A VEHICLE

(71) Applicant: VOLVO CAR CORPORATION, Gothenburg (SE)

(72) Inventors: Tony Gustafsson, Askim (SE); Mats Jonasson, Partille (SE)

(73) Assignee: VOLVO CAR CORPORATION, Gothenburg (SE)

( * ) Notice: Subject to any disclaimer, the term of this patent is extended or adjusted under 35 U.S.C. 154(b) by 342 days.

(21) Appl. No.: 15/726,871

(22) Filed: Oct. 6, 2017

(65) Prior Publication Data

US 2018/0105151 A1 Apr. 19, 2018

(30) Foreign Application Priority Data

Oct. 13, 2016 (EP) .................................... 16193753

(51) Int. Cl.
| | |
|---|---|
| *B60T 8/172* | (2006.01) |
| *B60T 8/175* | (2006.01) |
| *B60W 40/068* | (2012.01) |

(52) U.S. Cl.
CPC .............. *B60T 8/172* (2013.01); *B60T 8/175* (2013.01); *B60W 40/068* (2013.01);
(Continued)

(58) Field of Classification Search
CPC ...... B60T 8/175; B60T 8/172; B60T 2210/12; B60T 2250/042; B60T 2250/00; B60T 2240/00; B60W 40/068
See application file for complete search history.

(56) References Cited

U.S. PATENT DOCUMENTS

| 8,244,432 B2 * | 8/2012 | Kogure ............... B60W 40/068 |
| | | 180/197 |
| 9,707,967 B2 * | 7/2017 | Hartman ............... B60T 8/4872 |
| (Continued) | | |

FOREIGN PATENT DOCUMENTS

| EP | 2218621 | 8/2010 |
| EP | 2394876 | 12/2011 |
| (Continued) | | |

OTHER PUBLICATIONS

Extended European Search Report for European Application No. EP 161937531, Completed by the European Patent Office, dated May 15, 2017, 7 Pages.

*Primary Examiner* — Mussa A Shaawat
(74) *Attorney, Agent, or Firm* — Brooks Kushman P.C.

(57) ABSTRACT

There is provided a method for estimating friction between a tire of a vehicle and a road surface, the method comprising acquiring, a front wheel axle torque, a rear wheel axle torque, a vehicle longitudinal acceleration, a vehicle pitch rate and wheel rotational velocities. The method further comprises determining a front wheel normal force and a rear wheel normal force, based on a center of gravity of the vehicle and the longitudinal acceleration; determining a longitudinal tire stiffness, jointly determining a vehicle longitudinal velocity, based on the wheel rotational velocities and vehicle longitudinal acceleration, and a vehicle pitch angle relative to the horizontal plane based on the vehicle pitch rate; and determining a friction coefficient between tires and ground based on the front and rear wheel axle torque, the front wheel normal force and the joint estimation of pitch angle and vehicle longitudinal velocity. There is also provided a system for performing the described method.

11 Claims, 3 Drawing Sheets

(52) U.S. Cl.
CPC ....... *B60T 2210/12* (2013.01); *B60T 2240/00* (2013.01); *B60T 2250/00* (2013.01); *B60T 2250/042* (2013.01)

(56) References Cited

U.S. PATENT DOCUMENTS

| | | |
|---|---|---|
| 2005/0033499 A1 | 2/2005 | Ekmark et al. |
| 2005/0038588 A1* | 2/2005 | Shukla .................. B60T 8/1755 701/70 |
| 2005/0038589 A1* | 2/2005 | Shukla .................. B60T 8/172 701/80 |
| 2005/0055149 A1* | 3/2005 | Kato ....................... B60T 8/172 701/80 |
| 2010/0114431 A1* | 5/2010 | Switkes ............. B60T 8/17557 701/41 |
| 2010/0114449 A1* | 5/2010 | Shiozawa ................ B60L 3/10 701/90 |
| 2010/0131165 A1* | 5/2010 | Salman .................. B60T 8/172 701/70 |
| 2011/0015906 A1* | 1/2011 | Bian ....................... B60T 8/172 703/2 |
| 2011/0209521 A1* | 9/2011 | Shiozawa ............... B60L 3/102 73/9 |
| 2012/0029783 A1 | 2/2012 | Takenaka et al. |
| 2015/0019094 A1 | 1/2015 | Larkin et al. |
| 2015/0314759 A1* | 11/2015 | Nicolet ................ B60T 8/1755 701/70 |
| 2018/0037234 A1* | 2/2018 | Hoedt .................... B60T 8/172 |

FOREIGN PATENT DOCUMENTS

| | | |
|---|---|---|
| EP | 3028909 | 6/2016 |
| WO | 03008243 | 1/2003 |
| WO | 2008112667 | 9/2008 |
| WO | 2014156903 | 10/2014 |

* cited by examiner

METHOD AND SYSTEM FOR DETERMINING FRICTION BETWEEN THE GROUND AND A TIRE OF A VEHICLE

CROSS-REFERENCE TO RELATED APPLICATIONS

This application claims foreign priority benefits under 35 U.S.C. § 119(a)-(d) to European patent application number EP 16193753.7, filed Oct. 13, 2016, which is incorporated by reference in its entirety.

TECHNICAL FIELD

The present disclosure relates to a method and system for determining friction between the ground and a tire of a vehicle.

BACKGROUND

Vehicle motion is highly dependent on the friction coefficient, i.e. the friction between the tires and ground. Therefore an accurate estimate of friction is valuable for many active safety functions such as collision avoidance. For example if low tire-to-road friction can be detected, the driver can be alerted, brake intervention can be performed earlier and the risk of collision and serious injuries can thereby be decreased. It is also expected that autonomous driving will require accurate friction estimation to adapt vehicle speed automatically, where driving fast on low friction surfaces could cause hazards such as skidding.

Since it is typically both difficult and costly to directly measure friction, the research society and car industry has been focusing on technologies where the tire itself acts as the friction "sensor". That is, by utilizing vehicle dynamics models which relate e.g. tire slip and force as a function of friction, together with motion sensors such as inertial measurement units, wheel-speed sensors, etc., friction can be estimated.

US2005/0033499 discloses a method for estimating the road-to-tire friction in order for a collision avoidance system to adapt to current road friction conditions. In the method described in US2005/0033499, wheels are actively excited by applying an opposing torque to wheels on the respective first and second axle.

However, a major limitation of current slip-force based estimation technologies is that estimation of slip is very difficult to perform in the case where all wheels experience longitudinal wheel forces e.g. during braking and/or all-wheel drive. Moreover, many existing friction estimation algorithms are active only during aggressive maneuvers, e.g. during acceleration or braking or cornering. The problem is also to estimate friction coefficient during low force excitement of the tires.

Accordingly, there is a need for an improved system and method for determining tire-to-road friction in a vehicle.

SUMMARY

In view of above-mentioned and other drawbacks of the prior art, it is an object of the present disclosure to provide an improved method and system for determining road/surface friction in a vehicle.

According to a first aspect of the disclosure, there is provided a method for estimating friction between a tire of a vehicle and a road surface, the method comprising acquiring:

a front wheel axle torque, $T_f$;
a rear wheel axle torque, $T_r$;
a vehicle longitudinal acceleration, $a_x$;
a vehicle pitch rate, $\Omega_y$; and
wheel rotational velocities, $\omega^m_{f,r}$.

The method further comprises determining a front wheel normal force, $F_{zf}$ and a rear wheel normal force, $F_{zr}$, based on a center of gravity of the vehicle and the longitudinal acceleration; determining a longitudinal tire stiffness, $k_i$; jointly determining a vehicle longitudinal velocity, $v_x$, based on the wheel rotational velocities and vehicle longitudinal acceleration, and a vehicle pitch angle, $\theta_y$, relative to the horizontal plane based on the vehicle pitch rate; and determining a friction coefficient, $\mu_i$, between tires and ground based on the front and rear wheel axle torque, the front wheel normal force and the joint estimation of pitch angle and vehicle longitudinal velocity.

A particular problem related to friction coefficient estimation, is that as it is described in the literature, it requires vehicle speed information. However, vehicle speed is very hard to estimate when all wheels are either braked or propelled since all wheels can be assumed to have a high amount of wheel slip, and hence wheel speed sensors gives less information about vehicle speed. The proposed disclosure solves this issue with a minimum of restrictive assumptions.

That the vehicle longitudinal velocity is determined jointly with the vehicle pitch angle rate should in the present context be understood as an interdependent determination of the two parameters as will be described in the following.

In particular, the present disclosure is based on the realization that by using a pitch-rate sensor the vehicle pitch angle can be estimated with sufficient accuracy. The pitch angle is crucial to in turn estimate the vehicle speed over ground, since the contamination of gravity of the vehicle's accelerometers can be cancelled using the information about the vehicle pitch. The vehicle speed is required for estimating the tire longitudinal slip. The core of the friction estimating method is that tire slip and wheel torque is estimated and by using a model, selects the best fit data. An improved accuracy of the wheel slip will in turn improve the friction estimate and at the same time provide an accurate pitch angle estimate.

According to one embodiment of the disclosure, the friction coefficient may be determined based on a complete state dynamics model according to $$J_{wf}\dot{\omega}_f = T_f - F_{zf}g(s_f;\theta_f)r_f$$

$$J_{wr}\dot{\omega}_r = T_r - F_{zr}g(s_r;\theta_r)r_r$$

$$\dot{\theta}_y = \Omega_y$$

$$\dot{v}_x = a_x + g\sin\theta_y$$

where $J_{f,r}$ is the front and rear wheel inertia, $s_{f,r}$ is the front and rear wheel slip, and $\theta_{f,r}$ is a vector containing the model parameters, $\theta_i = [k_i\ \mu_i]$.

According to one embodiment of the disclosure, the function g is described by a brush model.

According to one embodiment of the disclosure the center of gravity of the vehicle may be determined based on a known vehicle geometry. Thereby, there is no need to determine the center of gravity for a given vehicle in advance.

According to one embodiment of the disclosure, the vehicle longitudinal acceleration and the vehicle pitch rate may be acquired from an inertial measurement unit, IMU.

Thereby, a sensor arrangement which is commonly available in vehicles can be used to determine the pitch rate. This brings the advantage that the described method can be used also in existing vehicles which are not previously equipped with the tire/road friction determination functionality.

According to one embodiment of the disclosure, determining a wheel axle torque may comprise determining a brake torque based on a hydraulic brake pressure and determining an engine torque based on a mass flow and a fuel flow of a combustion engine of the vehicle. Accordingly, wheel axle torque can be determined using sensors which are already used for other purposes, and there is thus no need for dedicated wheel torque sensors. Accordingly, the described method may in principle be used in already existing vehicle with a minimum of retrofitting or upgrades required. Moreover, for electrical or hybrid vehicles, the wheel axle torque may also be determined based on a torque provided to the axle by an electrical machine.

According to a second aspect of the disclosure, there is provided a tire-road friction determination system in a vehicle, the system comprising: a wheel axle torque sensing arrangement configured to detect a front and rear wheel axle torque; an acceleration sensor configured to detect a vehicle longitudinal acceleration; a pitch rate sensor configured to detect a pitch rate of the vehicle; at least one rotational velocity sensor configured to detect a wheel rotational velocity of at least one wheel; and an electronic control unit (ECU) configured to acquire:
 a front wheel axle torque, $T_f$;
 a rear wheel axle torque, $T_r$;
 a vehicle longitudinal acceleration, $a_x$;
 a vehicle pitch rate, $\Omega_y$; and
 wheel rotational velocities, $\omega^m_{f,r}$;
the electrical control unit being further configured to: determine a front wheel normal force, $F_{zf}$ and a rear wheel normal force, $F_{zr}$, based on a center of gravity of the vehicle and the longitudinal acceleration; determine a longitudinal tire stiffness, $k_t$; jointly determine a vehicle longitudinal velocity, $v_x$ based on the wheel rotational velocities and vehicle longitudinal acceleration, and a vehicle pitch angle relative to the horizontal plane based on the vehicle pitch rate; and determine a friction coefficient, $\mu_t$, between a wheel and ground based on the front and rear wheel axle torque, the front wheel normal force and the joint estimation of pitch angle and vehicle longitudinal velocity.

According to one embodiment of the disclosure the pitch rate sensor may comprise an inertial measurement unit, IMU. The IMU may comprise one or more accelerometers, gyroscopes, magnetometers and/or any combination thereof. Moreover, the sensor used to determine the pitch rate may be a dedicated pitch rate sensor or a general purpose sensor such as an IMU used also for other functions of a vehicle.

According to one embodiment of the disclosure the wheel axle torque sensing arrangement may comprise at least one hydraulic brake pressure sensor configured to determine a brake torque of each wheel and a mass flow sensor and a fuel flow sensor configured to determine an engine torque provided to each of said wheels based on a mass flow and a fuel flow of a combustion engine of the vehicle. However, it is also possible to use dedicated torque sensors arranged on the respective wheel axles to determine the respective wheel axle torques.

Further effects and features of the second aspect of the disclosure are largely analogous to those described above in connection with the first aspect of the disclosure.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the appended drawings showing an example embodiment of the disclosure, wherein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the present detailed description, various embodiments of the method and according to the present disclosure will be described.

Figure 1:
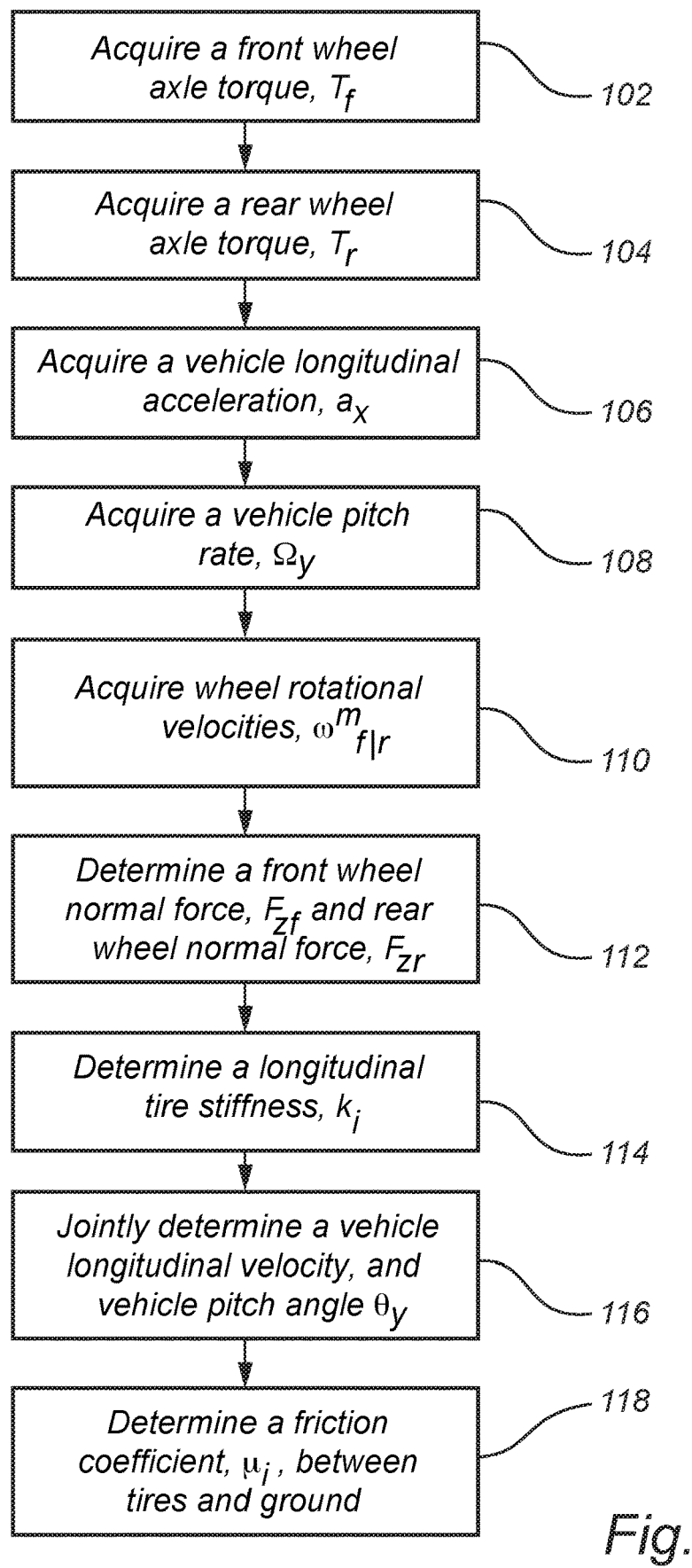
FIG. 1 is a flow chart outlining the general steps of a method according to an embodiment of the disclosure.

FIG. 1 is a flow chart outlining the general steps of a method for estimating friction between a tire of a vehicle and a road surface according to an embodiment of the disclosure.

The method comprises acquiring:
 a front wheel axle torque, $T_f$ 102;
 a rear wheel axle torque, $T_r$ 104;
 a vehicle longitudinal acceleration, $a_x$ 106;
 a vehicle pitch rate, $\Omega_y$ 108; and
 wheel rotational velocities, $\omega^m_{f,r}$ 110.

The method further comprises determining 112 a front wheel normal force, $F_{zf}$ and a rear wheel normal force, $F_{zr}$, based on a center of gravity of the vehicle and the longitudinal acceleration; determining 114 a longitudinal tire stiffness, $k_t$; jointly determining 116 a vehicle longitudinal velocity, $v_x$, based on the wheel rotational velocities and vehicle longitudinal acceleration, and a vehicle pitch angle, $\theta_y$, relative to the horizontal plane based on the vehicle pitch rate; and determining 118 a friction coefficient, $\mu_t$, between tires and ground based on the front and rear wheel axle torque, the front wheel normal force and the joint estimation of pitch angle and vehicle longitudinal velocity.

The described method for determining tire/road friction is based on an analytical model which models the physics between the slip and the force. In particular, a model is provided which determines vehicle velocity taking the vehicle pitch into account.

The model assumes access to standard vehicle dynamics sensors such as wheel speed signals from an ABS system and the longitudinal acceleration from an Inertial Measurement Unit (IMU) as well as access to measurements of the vehicle pitch rate from a pitch rate sensor such as the IMU.

In the following, signal processing algorithms for estimation of the tire/road friction coefficient will be described in further detail. First, information related to wheel velocities is derived. The vehicle geometry is as follows:

$l_f$: Longitudinal distance from center of gravity to the front axle.

$l_r$: Longitudinal distance from center of gravity to the rear axle.

$w_f$: Half front track width.

$w_r$: Half rear track width.

It is assumed that the vehicle is moving in the plane and that the longitudinal and lateral vehicle velocity expressed in the center-of-gravity coordinate system is $v_x$ and $v_y$, respectively. It is further assumed that the vehicle yaw-rate is $\Omega_z$. The basic relation used next is that the velocity vector $v^P$ at a point P which is rotating with rate $\Omega_z$ relative the center-of-gravity coordinate system is:

$$v^P = v + \begin{bmatrix} 0 \\ 0 \\ \Omega_z \end{bmatrix} \times P$$

Here $v=[v_x \ v_y \ 0]^T$ is the velocity vector at the center of gravity, and $v^P=[v_x^P \ v_y^P \ 0]^T$. Note that all velocity components are expressed using the vehicle attached center-of-gravity coordinate system. In the following the short hand notation FL=1, FR=2, RL=3, and RR=4 is used.

Assume further that the front and rear wheels have steering angles $\delta_{,f}$ and $\delta_{,r}$, respectively. The longitudinal component of the wheel velocity in the local tire coordinate system $P_i$ is thus related to the vehicle center of gravity velocities as:

$$\begin{bmatrix} v_x^{P_1} \\ v_x^{P_2} \\ v_x^{P_3} \\ v_x^{P_4} \end{bmatrix} = \begin{bmatrix} (v_x - w_f\Omega_z)\cos\delta_f + (v_y + l_f\Omega_z)\sin\delta_f \\ (v_x + w_f\Omega_z)\cos\delta_f + (v_y + l_f\Omega_z)\sin\delta_f \\ (v_x - w_r\Omega_z)\cos\delta_r + (v_y - l_r\Omega_z)\sin\delta_r \\ (v_x + w_r\Omega_z)\cos\delta_r + (v_y - l_r\Omega_z)\sin\delta_r \end{bmatrix}$$

Here it is assumed that the left and right front/rear wheel angles are identical. In the following it is assumed assume for simplicity that the rear wheel angle is zero.

The longitudinal wheel slip is defined as:

$$s_i = \frac{\omega_i r_i - v_x^{P_i}}{v_x^{P_i}}$$

where $r_i$ is the effective wheel radius of the $i^{th}$ tire.

Next the relation between longitudinal tire slip and the applied normalized longitudinal tire force is considered. Although it is theoretically possible to extend the results to the case with so-called combined slip, this will not be described herein. In the literature an abundance of models relating the wheel slip $s_i$ and the applied normalized traction force $f_i$ can be found. In the current analysis only static models are considered.

A tire-force model common in the field of vehicle dynamics is the "brush-model" with parabolic normal load distribution, which states:

$$f_i = \begin{cases} k_i s_i - \frac{s_i|s_i|k_i^2}{3\mu_i} + \frac{s_i^3 k_i^3}{27\mu_i^2}, & |s_i| < \frac{3\mu_i}{k_i} \\ \mu_i \mathrm{sgn}(s_i), & \text{otherwise} \end{cases}$$

Here $k_i$ is the longitudinal tire stiffness parameter and $\mu_i$ is the friction coefficient, and $f_i$ is the normalized (with respect to the wheel normal force) force. Tire stiffness varies for different tires and the stiffness can change, for example through tire wear. However, tire wear is a slowly changing process and in the current context the tire stiffness $k_i$ can be considered to be constant. However, since car users may change tires to unknowns types, the stiffness need to be estimated onboard the vehicle. This is done by estimating the linear relationship between tire force and slip for small forces. The good thing is that stiffness not is dependent on friction for low forces, which makes the estimation of stiffness straightforward. Low forces can here be estimated as forces of up to 30% of the maximum force.

The brush-model is derived from physical considerations. An example among many candidates of a "curve-fitting-like" non-physical tire-force model is $$f_i = \mu_i \tanh\left(\frac{k_i}{\mu_i} s_i\right).$$

The exact form of the tire-force model is not critical for the development below. Hence, in the following it is simply assumed that the following static tire-force models are available:

$$f_i = g(s_i; \theta_i)$$

where $\theta_i$ is a vector containing the parameters of the model; e.g. $\theta_i = [k_i \ \mu_i]$.

The basic relation utilized here is that the dynamics of the wheel speed signals are given by:

$$J_{wf}\dot{\omega}_f = T_f - F_{zf} g(s_f; \theta_f) r_f$$

$$J_{wr}\dot{\omega}_r = T_r - F_{zr} g(s_r; \theta_r) r_r$$

for the front and rear wheels, respectively.

For simplicity only one side of the vehicle is studied. Here, the following parameters are assumed to be known with sufficient precision:

$J_{wf}$=front wheel inertia $J_{wr}$=rear wheel inertia tire parameters such as longitudinal stiffness in the brush model $r_{f,r}$: front and rear effective wheel radius.

Note that the longitudinal stiffness is considered known in the sense that it can be adapted from data using data where force utilization is low. In particular, at low forces the tire force is dependent on slip but not on the friction. Thereby, the longitudinal stiffness can be determined for low forces and once the longitudinal stiffness is known the friction can be determined when the wheel forces are higher, e.g. higher than 30% of a maximum force.

The front and rear effective wheel radius can be considered known in the sense that it can be adapted from known data.

The state vector (quantities that are to be estimated) for the problem at hand is defined as:

$$x = [\omega_f \ \omega_r \ \mu \ \theta_y]^T$$

The embodiment described presented herein is focused on the case where the vehicle is travelling in a more or less straight line. This assumption is made to simplify the analysis to a suitable extent.

The sensor data that feeds the proposed algorithm is:
$T_f$: front wheel axle torque
$T_r$: rear wheel axle torque
$a_x$: longitudinal acceleration acquired from the IMU
$\Omega_y$: pitch rate acquired from the IMU
$F_{zf}$: front wheel normal force
$F_{zr}$: rear wheel normal force
$\omega^m_{f,r}$: measured wheel rotational velocities.

It can be noted that there is no sensor available that directly measures the tire normal forces. Instead it is assumed that wheel normal forces can be estimated using standard assumptions on static torque equilibrium around a pitch axis through center of gravity known by the skilled person.

$$F_{zf} = \frac{-mha_x + mgl_r}{l_f + l_r}$$

$$F_{zr} = \frac{mha_x + mgl_f}{l_f + l_r}$$

Here h is the height of the center of gravity of the vehicle, which can be assumed to be known with sufficient precision, g is the gravitational constant, and m is the nominal mass of the vehicle, also assumed known with sufficient precision. The above expression can easily be modified to include also the air-resistance by a person skilled in the art.

One problem related to the current analysis is as follows. Assume that the vehicle applies torques $T_{f,r}$ on the front and/or rear axle and as a result, the wheel rotational velocity changes. However, the change rate will depend on at least the friction. While driving on ice, a small change in applied torque results in a large change in wheel rotational speed. If all wheel rotational velocities are affected by slip then the estimation of the vehicle's longitudinal velocity is difficult. In an attempt to mitigate the problem one can consider to integrate the longitudinal acceleration for estimation of $v_x$. As long as the vehicle is on flat ground this could work; but in general the problem is that the gravity vector affects the reading of the longitudinal acceleration (valid as long as the vehicle is travelling straight ahead):

$$a_x = \dot{v}_x - g \sin \theta_y.$$

Thus, for estimation of the longitudinal velocity using integration, also pitch angle has to be estimated, which leads to the conclusion that pitch-rate sensing is essential for accurate estimation of the longitudinal velocity. As long as the vehicle is travelling straight ahead, the model for the pitch-rate sensor signal is:

$$\dot{\theta}_y \approx \Omega_y.$$

In conclusion, the non-linear complete state dynamics model for the problem at hand is:

$$J_{wf}\dot{\omega}_f = T_f - F_{zf}g(s_f;\theta_f)r_f$$

$$J_{wr}\dot{\omega}_r = T_r - F_{zr}g(s_r;\theta_r)r_r$$

$$\dot{\theta}_y = \Omega_y$$

$$\dot{v}_x = a_x + g \sin \theta_y$$

Figure 2:
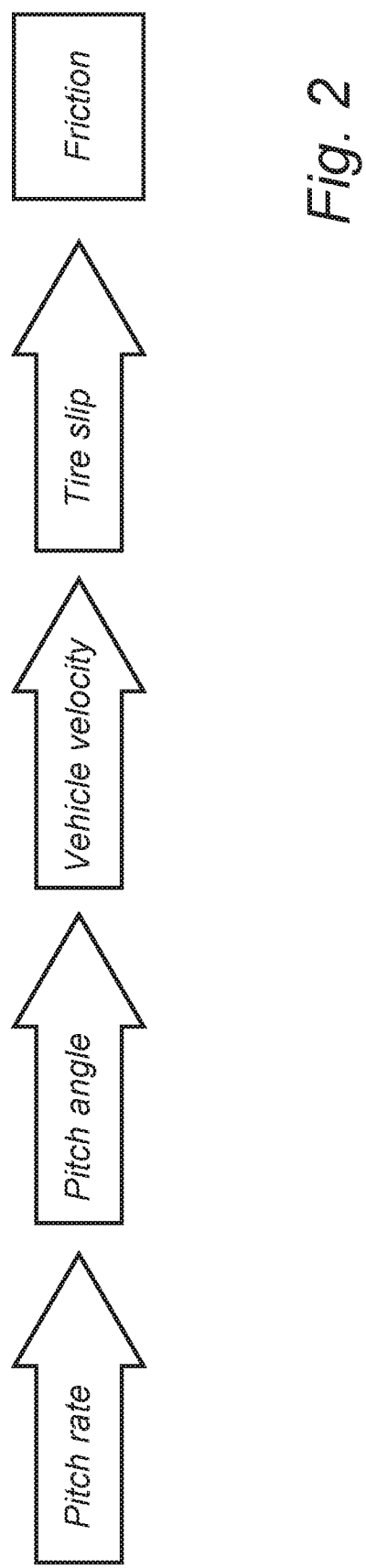
FIG. 2 is a block chart outlining general features of the present disclosure.

Based on the above described modelling, the friction coefficient can be estimated based on a torque estimation, a force estimation and a stiffness estimation as illustrated schematically in FIG. 2 where the general flow of calculations can be described as pitch rate→pitch angle→vehicle velocity→tire longitudinal slip→friction.

The modelling described above has defined the equations that govern the state dynamics, and it has been specified which sensor data that is assumed available. The exact choice of non-linear filtering algorithm used can be considered to be less important since this a standard topic for the person skilled in the art.

Figure 3:
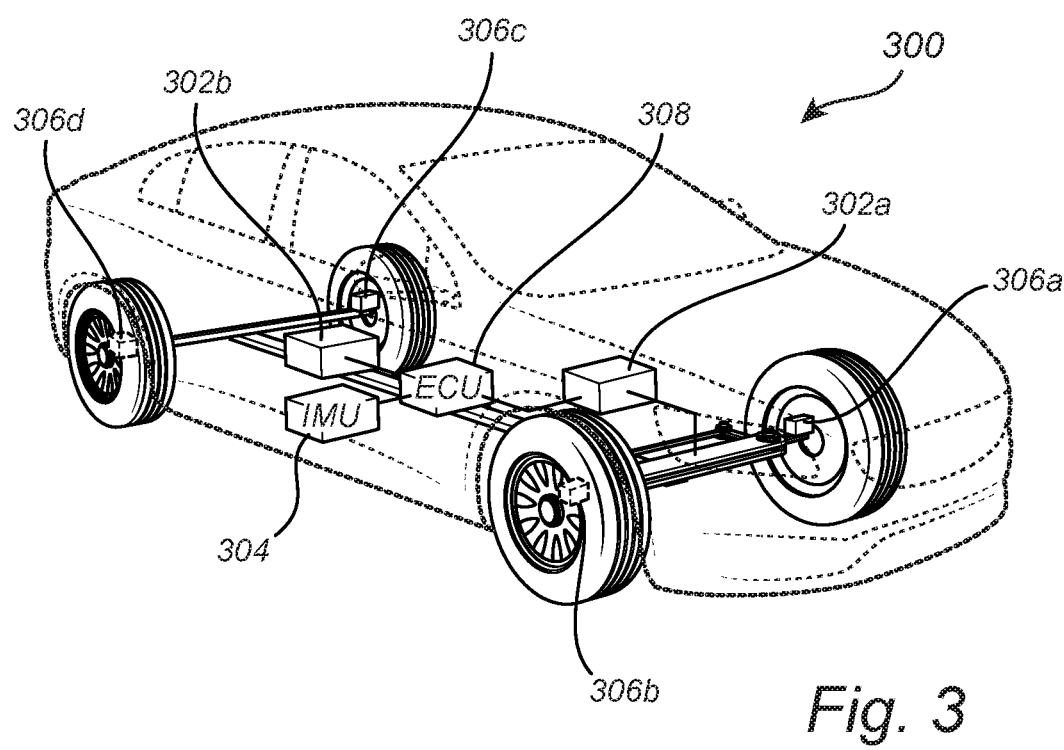
FIG. 3 is a schematic illustration of a vehicle comprising a system according to an embodiment of the disclosure.

FIG. 3 schematically illustrate a vehicle 300 comprising a system configured to determine tire-to-road friction. The system comprises a wheel axle torque sensing arrangement 302a-b configured to detect a front and rear wheel axle torque, an acceleration sensor 304 configured to detect a vehicle longitudinal acceleration and a pitch rate sensor 304 configured to detect a pitch rate of the vehicle. Here the acceleration sensor and pitch rate sensor are illustrated as one inertial measurement unit, IMU. The system also comprises a plurality of rotational velocity sensors 306a-d configured to detect a wheel rotational velocity of a respective one of each of the four wheels. The above mentioned sensors are connected to an a electronic control unit (ECU) 308 which in turn is configured to acquire a front wheel axle torque, a rear wheel axle torque, a vehicle longitudinal acceleration, a vehicle pitch rate and wheel rotational velocities from the sensors.

Based on the acquired information, the electrical control unit 308 is further configured to: determine a front and rear wheel normal force based on a center of gravity of the vehicle and the longitudinal acceleration, determine a longitudinal tire stiffness, jointly determine a vehicle longitudinal velocity based on the wheel rotational velocities and vehicle longitudinal acceleration, and a vehicle pitch angle relative to the horizontal plane based on the vehicle pitch rate. Thereby a friction coefficient, $\mu_t$, between a wheel and ground can be determined based on the front and rear wheel axle torque, the front wheel normal force and the joint estimation of pitch angle and vehicle longitudinal velocity.

It should be noted that the ECU 308, as well as any other system, device, unit, arrangement or the like described herein may comprise and/or be implemented in or by one or more appropriately programmed processors (e.g., one or more microprocessors including central processing units (CPU)) and associated memory and/or storage, which may include operating system software, application software and/or any other suitable program, code or instructions executable by the processor(s) for controlling operation thereof, for providing and/or controlling interaction and/or cooperation between the various features and/or components described herein, and/or for performing the particular algorithms represented by the various functions and/or operations described herein.

Even though the disclosure has been described with reference to specific exemplifying embodiments thereof, many different alterations, modifications and the like will become apparent for those skilled in the art. Also, it should be noted that parts of the method and system may be omitted, interchanged or arranged in various ways, the method and system yet being able to perform the functionality of the present disclosure.

Additionally, variations to the disclosed embodiments can be understood and effected by the skilled person in practicing the claimed disclosure, from a study of the drawings, the disclosure, and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for estimating friction between a tire of a vehicle and a road surface, the method comprising:
   acquiring:
     a front wheel axle torque, $T_f$;
     a rear wheel axle torque, $T_r$;
     a vehicle longitudinal acceleration, $a_x$;
     a vehicle pitch rate, $\Omega_y$; and
     a plurality of wheel rotational velocities, $\omega^m{}_{f,r}$;
   determining a front wheel normal force, $F_{zf}$, and a rear wheel normal force, $F_{zr}$, based on a center of gravity of the vehicle and the longitudinal acceleration;
   determining a longitudinal tire stiffness, $k_i$;
   jointly determining a vehicle longitudinal velocity, $v_x$, based on the wheel rotational velocities and vehicle longitudinal acceleration, and a vehicle pitch angle, $\theta_y$, relative to a horizontal plane based on the vehicle pitch rate; and
   determining a friction coefficient, $\mu_i$, between a tire and the road surface based on the front and rear wheel axle torques, the front wheel normal force and the joint determination of the pitch angle and the vehicle longitudinal velocity.

2. The method according to claim 1 wherein the friction coefficient is determined based on a complete state dynamics model according to $$J_{wf}\dot{\omega}_f = T_f - F_{zf} g(s_f; \theta_f) r_f$$

$$J_{wr}\dot{\omega}_r = T_r - F_{zr} g(s_r; \theta_r) r_r$$

$$\dot{\theta}_y = \Omega_y$$

$$\dot{v}_x = a_x + g \sin \theta_y$$

where $J_{f,r}$ is the front and rear wheel inertia, $s_{f,r}$ is the front and rear wheel slip, and $\theta$ is a vector containing the model parameters, $\theta_i = [k_i \ \mu_i]$.

3. The method according to claim 2 wherein the function g is described by a brush model.

4. The method according to claim 1 wherein the center of gravity of the vehicle is determined based on a known vehicle geometry.

5. The method according to claim 1 wherein the vehicle longitudinal acceleration and the vehicle pitch rate are acquired from an inertial measurement unit, IMU.

6. The method according to claim 1 wherein determining a wheel axle torque comprises determining a brake torque based on a hydraulic brake pressure and determining an engine torque based on a mass flow and a fuel flow of a combustion engine of the vehicle.

7. A tire-road friction determination system in a vehicle, the system comprising:
   a wheel axle torque sensing arrangement configured to detect a front wheel axle torque and a rear wheel axle torque;
   an acceleration sensor configured to detect a vehicle longitudinal acceleration;
   a pitch rate sensor configured to detect a pitch rate of the vehicle;
   at least one rotational velocity sensor configured to detect a wheel rotational velocity of at least one wheel; and
   an electronic control unit configured to
   acquire:
     a front wheel axle torque, $T_f$;
     a rear wheel axle torque, $T_r$;
     a vehicle longitudinal acceleration, $a_x$;
     a vehicle pitch rate, $\Omega_y$; and
     at least one wheel rotational velocity, $\omega^m{}_{f,r}$;
   the electrical control unit being further configured to
     determine a front wheel normal force, $F_{zf}$ and a rear wheel normal force, $F_{zr}$, based on a center of gravity of the vehicle and the longitudinal acceleration;
     determine a longitudinal tire stiffness, $k_i$;
     jointly determine a vehicle longitudinal velocity, $v_x$, based on the at least one wheel rotational velocity and vehicle longitudinal acceleration, and a vehicle pitch angle relative to the horizontal plane based on the vehicle pitch rate; and
     determine a friction coefficient, $u_i$, between a wheel and ground based on the front and rear wheel ale torque, the front wheel normal force and the joint determination of pitch angle and vehicle longitudinal velocity.

8. The system according to claim 7 wherein the electronic control unit is further configured to determine the friction coefficient based on a complete state dynamics model according to $$J_{wf}\dot{\omega}_f = T_f - F_{zf} g(s_f; \theta_f) r_f$$

$$J_{wr}\dot{\omega}_r = T_r - F_{zr} g(s_r; \theta_r) r_r$$

$$\dot{\theta}_y = \Omega_y$$

$$\dot{v}_x = a_x + g \sin \theta_y$$

where $J_{f,r}$ is the front and rear wheel inertia, $s_{f,r}$ is the front and rear wheel slip, and $\theta$ is a vector containing the model parameters, $\theta_i = [k_i \ \mu_i]$.

9. The system according to claim 7 wherein the pitch rate sensor comprises an inertial measurement unit, IMU.

10. The system according to claim 7 wherein the wheel axle torque sensing arrangement comprises:
    at least one hydraulic brake pressure sensor configured to determine a brake torque of each wheel; and
    a mass flow sensor and a fuel flow sensor configured to determine an engine torque provided to each of the wheels based on a mass flow and a fuel flow of a combustion engine of the vehicle.

11. A vehicle comprising a tire-road friction determination system according to any one of claim 7.

* * * * *